(12) United States Patent
Gershony et al.

(10) Patent No.: US 7,734,414 B2
(45) Date of Patent: Jun. 8, 2010

(54) DEVICE, SYSTEM AND METHOD FOR DISPLAYING A CELL PHONE CONTROL SIGNAL IN FRONT OF A DRIVER

(76) Inventors: Yariv Gershony, 44A Hasbikmim Street, Hod Hasharon 45201 (IL); Gil Alter, 22 Zulman Shazar Street, Netanya (IL); Gil Minzari, 40 Hagilad Street, Kohav Yair (IL); Shai Ghilai, 55A Ir Shemesh Street, Zahala, Tel Aviv (IL); Guy Levin, 15 Mantoer Street, Modiin (IL)

( * ) Notice: Subject to any disclaimer, the term of this patent is extended or adjusted under 35 U.S.C. 154(b) by 444 days.

(21) Appl. No.: 11/396,942

(22) Filed: Apr. 4, 2006

(65) Prior Publication Data

US 2007/0233376 A1   Oct. 4, 2007

(51) Int. Cl.
    *G06F 17/00* (2006.01)
(52) U.S. Cl. .......................... 701/211; 701/1
(58) Field of Classification Search ............. 701/36, 701/1, 211; 345/8
    See application file for complete search history.

(56) References Cited

U.S. PATENT DOCUMENTS

| | | | |
|---|---|---|---|
| 4,348,306 A | 9/1982 | Mischutin | |
| 5,619,370 A * | 4/1997 | Guinosso | 359/362 |
| 5,677,701 A * | 10/1997 | Okuyama et al. | 345/7 |
| 6,084,168 A | 7/2000 | Sitrick | |
| 6,908,196 B2 | 6/2005 | Herekar et al. | |
| 2002/1012532 | 9/2002 | Yavid et al. | |
| 2002/0154274 A1 | 10/2002 | Furuhata | |
| 2003/0160736 A1* | 8/2003 | Faso et al. | 345/8 |
| 2004/0129478 A1 | 7/2004 | Breed et al. | |
| 2004/0204004 A1 | 10/2004 | Chen | |
| 2005/0136982 A1 | 6/2005 | Li | |

FOREIGN PATENT DOCUMENTS

KR   2004/0019453   3/2004
WO   WO 2005/117401  12/2005

OTHER PUBLICATIONS

International Search Report for International Application No. PCT/US05/14183 Date of Mailing of International Search Report Aug. 31, 2005.
International Search Report and Written Opinion of International Application No. PCT/IL2007000305 Date of Completion of the search Sep. 2, 2008.

* cited by examiner

*Primary Examiner*—Yonel Beaulieu
(74) *Attorney, Agent, or Firm*—Pearl Cohen Zedek Latzer, LLP

(57) ABSTRACT

A device, system and method for transmitting a signal that controls a function of a cellular telephone from a key pad mounted on a steering wheel, and displaying an indication of such signal on a screen in front of a driver.

19 Claims, 3 Drawing Sheets

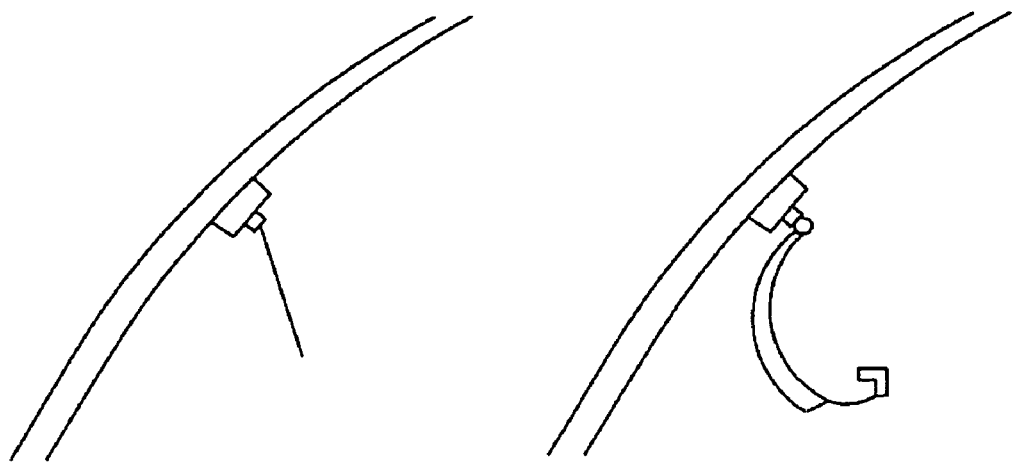
*FIG.3*  *FIG.4*
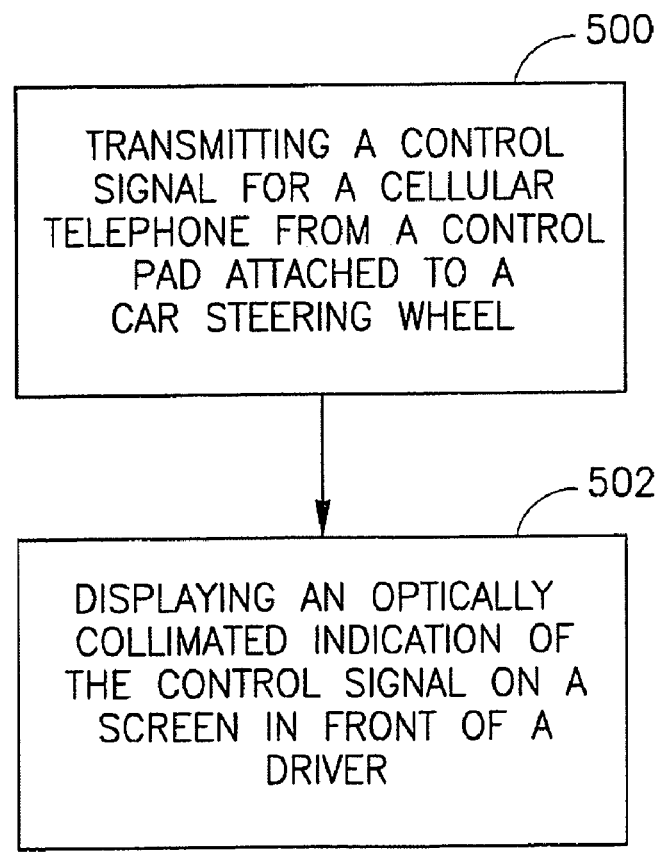
*FIG.5*

DEVICE, SYSTEM AND METHOD FOR DISPLAYING A CELL PHONE CONTROL SIGNAL IN FRONT OF A DRIVER

FIELD OF THE INVENTION

The present invention generally relates to head-up displays, and particularly to a head-up display for cell phone controls in an automobile.

BACKGROUND OF THE INVENTION

Operation or control of a cellular telephone while driving generally results in a driver taking the focus of his eyes off of the road ahead. Even typical 'hands free' solutions result in a driver changing his focus from the road ahead to a signal display.

SUMMARY OF THE INVENTION

Embodiments of the invention may include a system having a display that may be for example mounted in front of a driver between a dashboard and a windshield, a control pad that may be mounted on a steering wheel, and a communication link, where the control panel may transmit a control signal over the communicant link to control a function of a cellular telephone, and where the display shows an indication of the control signal. In some embodiments, the system includes a projector that may have an optical collimating system to project an indication of the control signal onto the display, so that such display is collimated near infinity. In some embodiments, the optical collimating system has a variable brightness function to alter a brightness of the displayed signal. In some embodiments, a display may be mounted at a fixed distance from the optical collimating system. In some embodiments, the communication link may include a wireless communication link between at least two of the control pad, the display and the cellular telephone. In some embodiments, the control pad may be constructed of a flexible material to assume a contour of an area of a steering wheel upon which the control panel is affixed. In some embodiments, the control panel may include a power source. In some embodiments, a system may include a mounting unit to mount the display from the windshield at an angle that may be adjustable with pressure from fingers. In some embodiments, the display may have a concave shape, and may include or be connected to a projector to project a signal onto the display.

In some embodiments, a device in accordance with an embodiment of the invention may include a screen for mounting in front of an automobile driver and above an automobile dashboard, where the screen displays characters optically collimated near infinity, and the characters indicate a cellular telephone control signal. In some embodiments, the device may include a projector to project characters onto the screen. In some embodiments, the projector includes a lighting element with adjustable brightness. In some embodiments the screen includes an area for four character display lines.

Some embodiments of the invention may include a method of transmitting a cellular telephone control signal from a control pad attached to a car steering wheel, and displaying an optically collimated indication of the control signal on a screen located between a dashboard and a windshield.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 3 is a schematic illustration of an adjustable flat display screen mounting in accordance with an embodiment of the invention;

FIG. 4 is a schematic illustration of an adjustable concave display screen mounting and attached projector in accordance with an embodiment of the invention; and FIG. 5 is a flow diagram of a method in accordance with an embodiment of the invention.

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features or processes may be omitted or simplified in order not to obscure embodiments of the invention described herein.

The processes and functions presented herein are not inherently related to any particular computer, imager, output device or other apparatus. Embodiments of the invention described herein are not described with reference to any particular programming language, machine code, etc. It will be appreciated that a variety of programming languages, systems, protocols or hardware configurations may be used to implement the teachings of the embodiments of the invention as described herein. In some embodiments, the term "in front of a driver", may in addition to its usually meaning, include an area between a driver and a windshield, such as for example an area that is not directly in front of a driver, but that is over to a right or left side of a driver.

Figure 1:
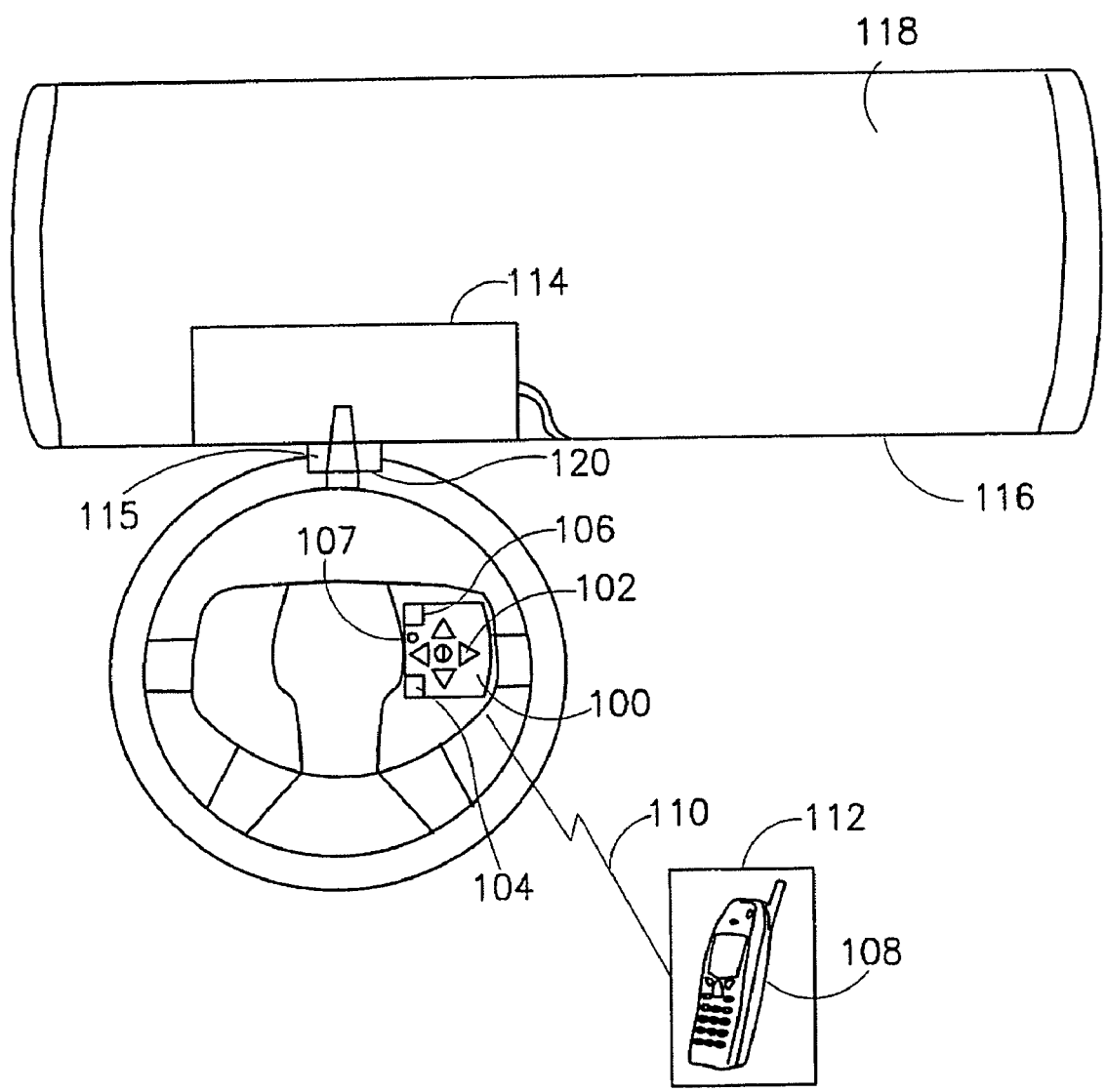
FIG. 1 is a front-view schematic illustration of a system installed in a car in accordance with an embodiment of the invention.

Reference is made to FIG. 1, a front-view schematic illustration of a system installed in a car in accordance with an embodiment of the invention. In some embodiments, a system may include a control pad or keypad 100 that may be mounted on or attached to for example a steering wheel or other car component that is easily accessible to one or more fingers of a driver, and so that a driver may navigate the keys 102 with one or more fingers without the need for the driver to look at the keys 102. Keypad 100 may be constructed of or include a flexible material such as a layered plastic that may be sufficiently flexible to assume a shape or contour of a steering wheel hub or other space onto which keypad 100 may be affixed or adhered. In some embodiments, keypad 100 may include an adhesive on a back side for easy mounting on a steering wheel hub, spoke or rim. Other ways of attaching keypad 100 to a steering wheel are possible.

Keypad 100 may include a power source, such as for example a battery 104 such as a replaceable battery. Keypad 100 may draw power from a car's electrical system or from other sources. Keypad 100 may include a transmitter and/or receiver 106, such as for example a wireless transmitter/ receiver, such as for example an infrared (IR), RF, wireless or other wired devices to transmit and/or receive signals. Transmission of signals may use a Bluetooth protocol or other protocol. In some embodiments, keypad 100 may include only a transmitter.

Keys 102 may be constructed as for example protruding keys or relatively flat pressure-sensitive layers to preserve a desired thinness to keypad 100. Keys 102 may include raised edges or other tangible markings to allow touch-sensitive detection of the identity and area of key 102.

In some embodiments, keypad 100 may include for example four, five, six or other number of keys 102. For example, keys 102 may include a set of four arrow keys 102, such as for example up, down, right, left, and one or more function keys 102 such as an enter, connect, disconnect or other function keys. In some embodiments, keys 102 may include numeric keys.

In some embodiments, keypad 100 may include or be connected to a microphone 107 or other voice collection instrument, and a voice processor. In some embodiments, microphone 107 may collect voice commands from a user, and a user may operate or control functions on telephone 108 though a combination of voice commands and commands that are inputted through keypad 100.

In some embodiments, transmitter/receiver 106 may be suitable to establish a communication link 110 with for example a cellular telephone 108, such as for example a cellular telephone with Bluetooth, IR or other short-range wireless communication capabilities. In some embodiments, communication link 110 may be established with a cellular telephone 108 holder such as a hands-free adaptor 112 as are installed in many cars. Other means of linking keypad 100 to telephone 108 are possible. In some embodiments, projector 120 or a screen controller may include a communications unit that may link projector 120 to one or more of keypad 100 and telephone 108.

In some embodiments, one or more of keypad 100, screen 114, projector 120 or other components included in or connected to them may include one or more instructions such as for example software instructions that may provide a graphical and or functional interface between keys 102, keypad 100 and one or more of screen 114 and telephone 108. In some embodiments, keypad 100 may include a memory such as for example a random access memory, flash memory, read only memory or other data storage facility to store such instructions.

In some embodiments, projector 120 may project light and image data onto for example a mirror and such mirror may reflect the projected light and image data onto screen 114.

Figure 2:
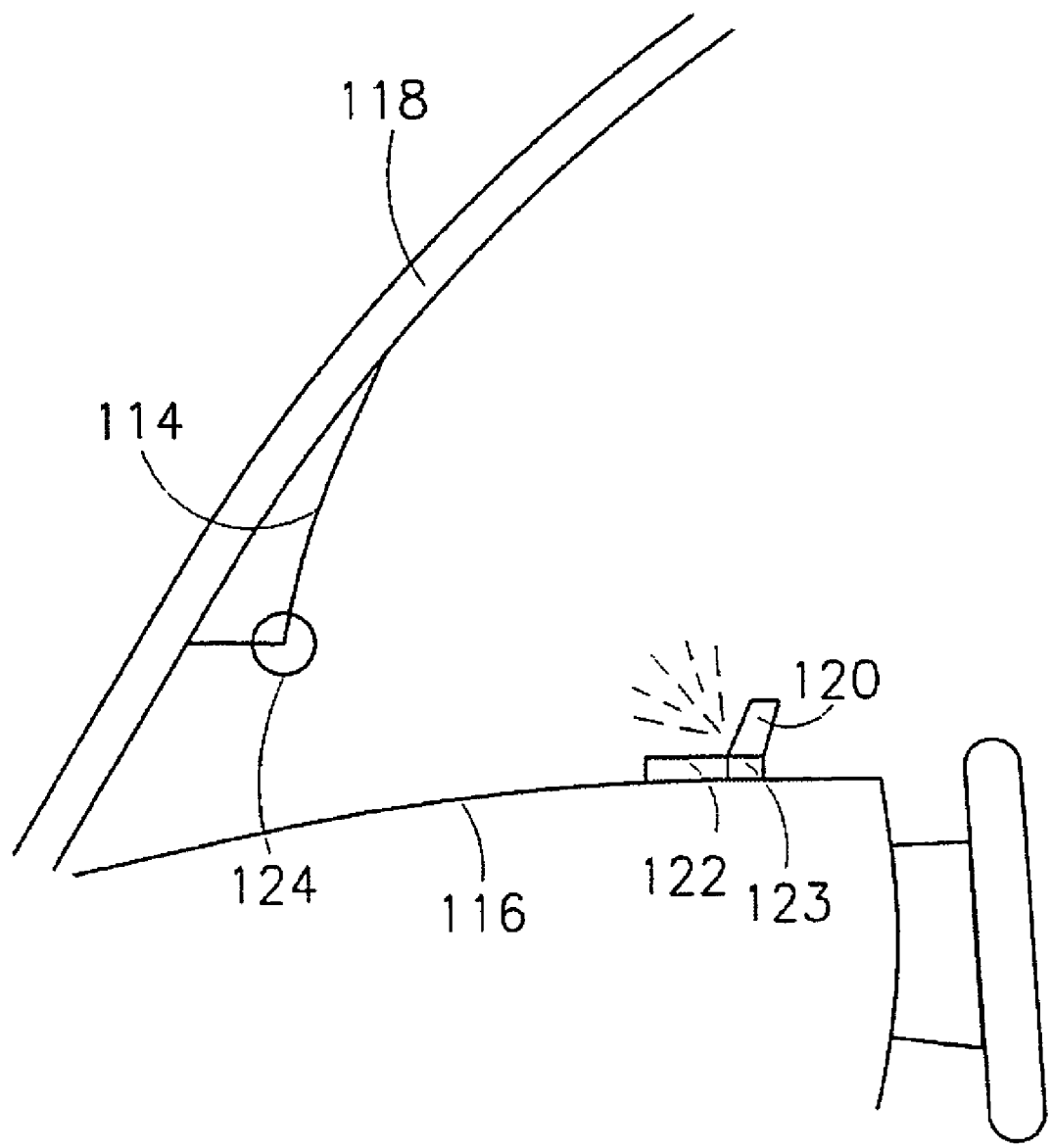
FIG. 2 is a side-view schematic illustration of a screen and projector mounted between a dashboard and an automobile windshield in accordance with an embodiment of the invention.

Reference is made to FIG. 2, a side-view schematic illustration of a screen and projector mounted on for example a dashboard, or between a dashboard and an automobile windshield, in accordance with an embodiment of the invention. A screen 114 such as for example a transparent or partially transparent display screen, may be set or mounted for example in front or directly in view of a driver, such as between for example a top of a dashboard 116 and a car windshield 118, slightly below a normal line of sight of a driver. In some embodiments, screen 114 may be attached to or constructed as part of a unit that may include for example a projector 120 and a mounting unit that may include or house for example a power source or power supply 122, a transmitter and/or receiver 124. In some embodiments, screen 114 and projector 120 may be separate. Some embodiments may not include a projector 120, and in some embodiments, screen 114 may include or be attached to power supply 122 and receiver 124. In some embodiments, screen 114 and or projector 120 may be connected to and powered by a car's electrical system. In some embodiments, screen 114 may be mounted on for example a bearing, hinge 126 or other flexible bracket, and an angle of one or both of screen 114 and projector 120 may be adjustable by for example pressure from for example fingers of a user to change an angle between screen 114 and a driver.

In some embodiments, projector 120 may be or include for example a dot matrix or LED, LCD display capability that may be suitable to form alphanumeric or other characters that may be visible by for example a driver. In some embodiments, projector 120 may include space for, for example four lines of for example 16 characters per line. Other sizes or numbers of characters or lines are possible.

In some embodiments, screen 114 may be concave and may be transparent, although a flat or tinted screen 114 may be used. Configurations of screen 114 may include the following: width: 120-150 mm; height: 50 mm; symbol size: 3×5 mRad; $\alpha \times \beta(Az \times El) \sim -20° \times -10°: -20°$. In some embodiments, screen 114 may be partially transparent, such as for example 50% transparent and 50% reflective. Other sizes and parameters are possible.

In some embodiments, a collimator 115 may be attached to or near projector 120 or screen 114. In some embodiments, collimator may be or include for example a transitive partially reflective concave mirror. Such mirror may have for example a zero power in transmission, thus enabling a driver to see through the projected image to the road. Collimation may be achieved by other means.

Reference is made to FIG. 3, a schematic illustration of an adjustable flat display screen and mounting in accordance with an embodiment of the invention. In some embodiments, screen 114 may be suspended from or stuck onto windshield 118, and may include for example a bracket or hinge to adjust an angle of screen 114 to a driver. In some embodiments, screen 114 may conform to a curve of for example a windshield 118.

In some embodiments, projector 120 may project images of for example alpha-numeric characters or other function or control signals onto screen 114. In some embodiments such images or characters may be optically collimated to for example near infinity. In some embodiments, optical collimation of the figures or characters displayed on screen 114 may make such figures or characters readily visible to a driver without disturbing or altering a focus of the driver's eyes away from the road ahead. An embodiment of the invention may facilitate operation of a cellular telephone with a driver's 'eyes on the road—hands upon the wheel'. Other methods of creating a distance focus of characters displayed on screen 114 are possible.

Reference is made to FIG. 4, a schematic illustration of an adjustable concave display screen mounting and attached projector in accordance with an embodiment of the invention. In some embodiments, screen 114 may be for example attached to projector 120 so that for example screen 114 may be suspended from windshield 118, while preserving a predefined distance and angle from projector 120. Other configurations of screen 114, projector 120 and a mounting unit are possible.

In operation, and in some embodiments, a user or driver may press one or more buttons or keys 102 on keypad 100. Transmitter and/or receiver 106 that may be on or linked to keypad 100 may communicate with or send for example a control signal to for example telephone 108. Transmitter and/or receiver 106 or a transmitter linked with telephone 108 or elsewhere may transmit one or more signals to screen 114 and projector 120, where such signals may include for example an indication of a control signal that was transmitted to telephone 108 or a signal that was received from telephone 108. For example, a user may press a key 102 on keypad 100 that may dial telephone 108. A dial message may be projected or otherwise appear on screen 114, and a signal may be sent to telephone 108 to indicate that the user is dialing a number. In some embodiments, a menu may be displayed on screen 114, and a user may navigate the menu using keys 102, to select the number or numbers to be dialed as they appear for example on screen 114. A key 102 may be used to enter the number to be dialed and for example dial instruction that may then be transmitted to telephone 108. In some embodiments screen 114 may display a phone book such as those as may be stored in a telephone 108, and a user may use keys 102 to navigate and select a number to be dialed. In some embodiments, all or some of the functions and displays as may be available on for example a cellular telephone 108, such as for example caller ID, call waiting, redial, small message systems, etc. may be displayed or accommodated for display on screen 114. An indication of such function or signal may be transmitted to and displayed on screen 114.

In some embodiments, directions, instructions or other signals from a mobile navigational system may also be displayed on screen 114, and such signals may be optically collimated to correlate the placement of the signal with the driver's view of the road ahead. For example, an arrow or directional signal from a mobile navigational system may be displayed to point in the direction to be traveled, and the position or angle of for example the arrow may move to correspond to the location of for example the turn-off indicated by the navigational system relative to the position of the windshield of the car. In some embodiments, a directional signal may appear or be highlighted only when a change in direction is called for, and may at other times fade or disappear.

In some embodiments communication link 110 may include a one-way link between for example telephone 108 and projector 120, and a two way communication link 110 between for example telephone 108 and keypad 100. In some embodiments, a communication link 110 may be between keypad 100 and each of telephone 108 and projector 120. Other combinations of communication links 110 are possible.

Reference is made to FIG. 5, a flow diagram of a method in accordance with an embodiment of the invention. In block 500, a transmitter that may for example be connected to a keypad or control pad that may be attached to or mounted on a car steering wheel, may transmit a signal that may control or operate a function of a cellular telephone or signal.

In block 502, an optically collimated light may generate an indication of the control signal that may be displayed on for example a transparent screen that may be mounted or otherwise located between a dashboard and a windshield. In some embodiments, the transmitting may be conducted over for example a wireless link. In some embodiments, a brightness of the light on the display may be adjustable by for example a user or in response to ambient light. In some embodiments, up to four lines of characters may be displayed on the screen.

It will be appreciated by persons skilled in the art that embodiments of the invention are not limited by what has been particularly shown and described hereinabove. Rather the scope of at least one embodiment of the invention is defined by the claims below.

We claim:

1. A system comprising:
 a display, said display for mounting in front of a driver between a dashboard and a windshield said display comprising an optical collimating system, wherein said optical collimating system is to project an indication of a control signal onto said display, said indication collimated near infinity;
 a control pad for mounting on a steering wheel; and
 a communication link;
  wherein said control pad is to transmit said control signal over said communicant link, said control signal is to control a function of a cellular telephone, and wherein said display is to display an indication of said control signal.

2. The system as in claim 1, wherein said optical collimating system, comprises a variable brightness function to alter a brightness of said indication of said control signal on said display.

3. The system as in claim 1, wherein said display is mounted at a fixed distance from said optical collimating system.

4. The system as in claim 1, wherein said communication link comprises a wireless communication link between at least two of said control pad, said display and said cellular telephone.

5. The system as in claim 1, wherein said control pad is constructed of a flexible material to assume a contour of an area of a steering wheel upon which said control panel is affixed.

6. The system as in claim 1, wherein said control panel comprises a power source.

7. The system as in claim 1, comprising a mounting unit to mount said display from a windshield at an angle, said angle adjustable with pressure from fingers.

8. The system as in claim 1, wherein said display has a concave shape, and comprising a projector to project said indication onto said display.

9. A device comprising a screen for mounting in front of an automobile driver and above an automobile dashboard, said screen to display characters being optically collimated near infinity, by an optical collimating system which projects an indication of a control signal on the display said characters indicating a cellular telephone control signal.

10. The device as in claim 9, comprising a projector to project said characters onto said screen.

11. The device as in claim 10, wherein said projector comprises a lighting element with adjustable brightness.

12. The device as in claim 9, comprising a wireless receiver to receive indications of said cellular telephone control signal.

13. The device as in claim 9, wherein said screen comprises an area for four character display lines.

14. The device as in claim 9, comprising a wireless receiver to receive an indication of a cellular telephone control signal.

15. A method comprising:
 transmitting a cellular telephone control signal from a control pad attached to a car steering wheel; and
 displaying an optically collimated indication of said control signal on a screen, said screen located in front of a driver;
 wherein said indication is collimated near infinity.

16. The method as in claim 15, wherein said transmitting comprises transmitting over a wireless link.

17. The method as in claim 15, comprising adjusting a brightness of said displaying.

18. The method as in claim 15, wherein said transmitting comprises wirelessly transmitting said control signal from said control pad to a cellular telephone.

19. The method as in claim 15, wherein said displaying comprises displaying up to four lines of characters on said screen.

* * * * *

UNITED STATES PATENT AND TRADEMARK OFFICE
CERTIFICATE OF CORRECTION

PATENT NO. : 7,734,414 B2  Page 1 of 1
APPLICATION NO. : 11/396942
DATED : June 8, 2010
INVENTOR(S) : Yariv Gershony et al.

It is certified that error appears in the above-identified patent and that said Letters Patent is hereby corrected as shown below:

On the title page item (76), should be replaced with the following paragraph:
Yariv Gershony, 44A Hashikmim Street, Hod Hasharon 45201 (IL); Gil Alter, 22 Zalman Shazar Street, Netanya (IL); Gil Minzari, 40 Hagilad Street, Kohav Yair (IL); Shai Ghilai, 55A Ir Shemesh Street, Zahala, Tel Aviv (IL); Guy Levin, 15 Mantoor Street, Modiin (IL)

Signed and Sealed this

Twenty-fourth Day of August, 2010

David J. Kappos
*Director of the United States Patent and Trademark Office*